United States Patent
Zhang et al.

(10) Patent No.: US 10,310,635 B2
(45) Date of Patent: Jun. 4, 2019

(54) MOUSE DEVICE

(71) Applicant: Primax Electronics Ltd., Taipei (TW)

(72) Inventors: Shi-Jie Zhang, Taipei (TW);
Chih-Feng Chien, Taipei (TW);
A-Ming Chang, Taipei (TW);
Ying-Che Tseng, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 197 days.

(21) Appl. No.: 15/651,996

(22) Filed: Jul. 17, 2017

(65) Prior Publication Data

US 2018/0275775 A1    Sep. 27, 2018

(30) Foreign Application Priority Data

Mar. 24, 2017    (TW) .............................. 106109931 A

(51) Int. Cl.
*G06F 3/0354*    (2013.01)

(52) U.S. Cl.
CPC ................. *G06F 3/03544* (2013.01)

(58) Field of Classification Search
CPC .......................... G06F 3/03543; G06F 3/03544
See application file for complete search history.

(56) References Cited

U.S. PATENT DOCUMENTS

| | | | | |
|---|---|---|---|---|
| 7,317,448 B1 * | 1/2008 | Sasselli | ................ | G06F 3/0317 345/163 |
| 8,026,899 B2 * | 9/2011 | Hou | ..................... | G06F 3/0304 345/163 |
| 8,803,805 B2 * | 8/2014 | Chang | ................... | G06F 3/0317 345/163 |
| 9,300,834 B2 * | 3/2016 | Zahnert | .................. | H04N 1/107 |
| 9,389,705 B2 * | 7/2016 | Young | .................... | G06F 3/0312 |
| 2008/0136781 A1 * | 6/2008 | Chang | ................... | G06F 1/3215 345/166 |
| 2009/0073122 A1 * | 3/2009 | Hou | ...................... | G06F 3/0304 345/163 |
| 2010/0073293 A1 * | 3/2010 | Itagaki | ................ | G06F 3/03543 345/163 |
| 2012/0092257 A1 * | 4/2012 | Chang | ................... | G06F 3/0317 345/166 |
| 2012/0256837 A1 * | 10/2012 | Chang | ................. | G06F 3/03544 345/163 |
| 2015/0138093 A1 * | 5/2015 | Young | .................... | G06F 3/0312 345/166 |

(Continued)

*Primary Examiner* — Patrick F Marinelli
(74) *Attorney, Agent, or Firm* — Kirton McConkie; Evan R. Witt

(57) ABSTRACT

A mouse device includes a mouse casing, a circuit board, a first sensing module, a second sensing module and a switching module. The circuit board is disposed within the mouse casing. The first sensing module and the second sensing module are disposed on the circuit board and partially exposed outside the mouse casing. The switching module is partially exposed outside the bottom part of the mouse casing. At least one of the first sensing module and the second sensing module is exposed outside the mouse casing through the switching module. Consequently, a moving resolution of the mouse device is adjustable according to the practical requirements. When both of the first sensing module and the second sensing module are enabled, the moving resolution is further increased.

8 Claims, 12 Drawing Sheets

(56) References Cited

U.S. PATENT DOCUMENTS

2015/0193015 A1* 7/2015 Kang .................... G06F 3/0317
                                                    345/166
2016/0282969 A1* 9/2016 Young ................... G06F 3/0312

* cited by examiner

MOUSE DEVICE

FIELD OF THE INVENTION

The present invention relates to an input device, and more particularly to a mouse device for controlling the movement of a cursor.

BACKGROUND OF THE INVENTION

The widely-used input device of a computer includes for example a mouse device, a keyboard device, a trackball device, a touchpad device, or the like. Among these input devices, the mouse device is the most prevailing because it is very easy-to-use for most users. When a mouse device is held by the palm of a user, the user may move the mouse device to control the movement of a cursor shown on a display screen of a computer.

Hereinafter, the structure and the function of a conventional mouse device will be illustrated with reference to FIG. 1. FIG. 1 schematically illustrates the connection between a conventional mouse device and a computer system. The computer system 2 comprises a computer host 21 and a display screen 22. The computer host 21 is in communication with a mouse device 1 and the display screen 22. The computer host 21 has a connecting port 211. A graphic-based window 221 and a cursor 222 are shown on the display screen 22. The mouse device 1 is used for controlling the cursor 222 to have the computer host 21 execute a corresponding command. The mouse device 1 comprises a main body 10, a left button 11, a right button 12, a scroll wheel 13, and a connecting cable 14. The left button 11 is disposed on the main body 10 and located at a left side of the scroll wheel 13. In addition, the left button 11 is exposed outside the main body 10. By pressing down the left button 11, a left button signal is generated. Like the left button 11, the right button 12 is disposed on the main body 10 and located at a right side of the scroll wheel 13. By pressing down the right button 12, a right button signal is generated. The scroll wheel 13 is disposed within the main body 10 and partially exposed outside the main body 10. By rotating the scroll wheel 13, a corresponding scrolling signal is generated. The connecting cable 14 is connected with the main body 10 and protruded outside the main body 10. When the connecting cable 14 is connected with the connecting port 211, the communication between the mouse device 1 and the computer system 2 is established.

The inner structure of the conventional mouse device will be described as follows. FIG. 2 is a schematic cross-sectional view illustrating the structure of the conventional mouse device. The main body 10 of the mouse device 1 is placed on a working surface T. The inner portion of the mouse device 1 comprises a circuit board 15, a sensing module 16 and a controlling unit 17. The sensing module 16 is disposed on the circuit board 15 and partially exposed to a bottom opening 101 of the main body 10. The sensing module 16 comprises a light-emitting element 161, an optical assembly 162 and an optical sensor 163. The light-emitting element 161 is disposed on the circuit board 15. Moreover, the light-emitting element 161 emits a light beam B. The optical assembly 162 is disposed within the main body 10. After the light beam B passes through the optical assembly 162, the light beam B is refracted by the optical assembly 162. Consequently, the light beam B is projected onto the working surface T, which is disposed under the main body 10. After the light beam B reflected by the working surface T is received by the optical sensor 163, a displacement signal is generated by the optical sensor 163 according to the light beam B. The control unit 17 is disposed on the circuit board 15 and electrically connected with the optical sensor 163.

The method of generating the displacement signal will be described as follows. When the mouse device 1 is placed on the working surface T but not moved, the light-emitting element 161 emits the light beam B. After the light beam B passes through the optical assembly 162, the light beam B is refracted by the optical assembly 162. Consequently, the light beam B is projected onto the working surface T. Then, the light beam B is reflected to the optical assembly 162 by the working surface T. After the light beam B passes through the optical assembly 162, the light beam B is received by the optical sensor 163. Meanwhile, the optical sensor 163 generates a first working surface image. When the mouse device 1 is placed on the working surface T and moved to a specified position, the light beam B from the first light-emitting element 161 is guided to the optical sensor 163 by the optical assembly 162, the working surface T and the optical assembly 162 sequentially. Meanwhile, the optical sensor 163 generates a second working surface image.

Then, the controlling unit 17 receives the first working surface image and the second working surface image from the optical sensor 163. According to the result of comparing the first working surface image with the second working surface image, the controlling unit 17 acquires a displacement amount of the main body 10 relative to the working surface T and generates a displacement signal according to the displacement amount. That is, when the mouse device 1 is moved on the working surface T, the sensing module 16 detects the displacement amount of the main body 10 relative to the working surface T and generates the displacement signal according to the displacement amount. After the displacement signal is received by the computer host 21, the movement of the cursor 222 on the display screen 22 is controlled by the computer host 21 according to the displacement signal.

With increasing development of mouse devices, the functions of the mouse devices are gradually increased. For example, the moving resolution of the mouse device is largely increased. The moving resolution of the mouse device denotes the sensitivity of moving the cursor of the computer host when the mouse device is moved for a certain distance. As the moving resolution is increased, the sensitivity of moving the cursor is increased. When the mouse device is used to operate the computer game, it is necessary to move the mouse device quickly. That is, the higher moving resolution of the mouse device is required. When the mouse device is used to perform a document processing task, the lower moving resolution of the mouse device is required. For preventing the user from frequently changing the suitable mouse device, a mouse device with a changeable moving resolution has been introduced into the market. This mouse device has a switching element for changing the moving resolution of the mouse device in response to the pressing action of the user. When the switching element is pressed down once, the moving resolution of the mouse device is changed. For example, the moving resolution is changed from 800 dots per inch (dpi) to 1600 dpi. When the switching element is pressed down again, the moving resolution is changed from 1600 dpi to 800 dpi. In other words, the moving resolution of the mouse device is changeable.

Although the moving resolution of the mouse device is changeable, there are still some drawbacks. For example, this mouse device cannot be applied to all kinds of working surfaces. In case that the working surface is made of a transparent material (e.g., acrylic resin), the light beam is transmissible through the working surface. Since the reflected portion of the light beam is reduced, the efficacy of generating the displacement signal is adversely affected.

Therefore, there is a need of providing a mouse device that has the adjustable moving resolution and is applicable to various working surfaces.

SUMMARY OF THE INVENTION

The present invention provides a mouse device that has the adjustable moving resolution and is applicable to various working surfaces.

In accordance with an aspect of the present invention, there is provided a mouse device. The mouse device is in communication with a computer system for controlling movement of a cursor of the computer system. The mouse device includes a mouse casing, a circuit board, a first sensing module, a second sensing module and a switching module. The mouse casing includes a receiving recess. The receiving recess is formed in a bottom part of the mouse casing and exposed outside the mouse casing. The circuit board is disposed within the mouse casing. The first sensing module is disposed on the circuit board. A part of the first sensing module is selectively exposed outside the bottom part of the mouse casing. The second sensing module is disposed on the circuit board. A part of the second sensing module is selectively exposed outside the bottom part of the mouse casing. The switching module is partially received within the receiving recess and partially exposed outside the bottom part of the mouse casing. At least one of the first sensing module and the second sensing module is exposed outside the bottom part of the mouse casing through the switching module. Consequently, a moving resolution of the mouse device is adjustable.

From the above descriptions, the mouse device of the present invention comprises plural sensing modules. The suitable sensing module is used according to the corresponding requirement. Alternatively, the plural sensing modules are simultaneously used. As the switching plate of the switching module is rotated (or moved) to shelter the unavailable sensing module, the required sensing module is exposed. The mechanical structure of the switching module cooperates with the simple detecting element and the controlling unit to achieve the function of switching the sensing module. Consequently, the mouse device of the present invention is simple and cost-effective. The uses of plural sensing modules are more beneficial. If one of the plural sensing modules is not suitably applied to the working surface, the other sensing module or sensing modules can be normally operated. Consequently, the operation of the mouse device is not influenced by the mouse device. In other words, the mouse device of the present invention is suitably operated on various working surfaces.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks of the conventional technologies, the present invention provides a mouse device.

Figure 1:
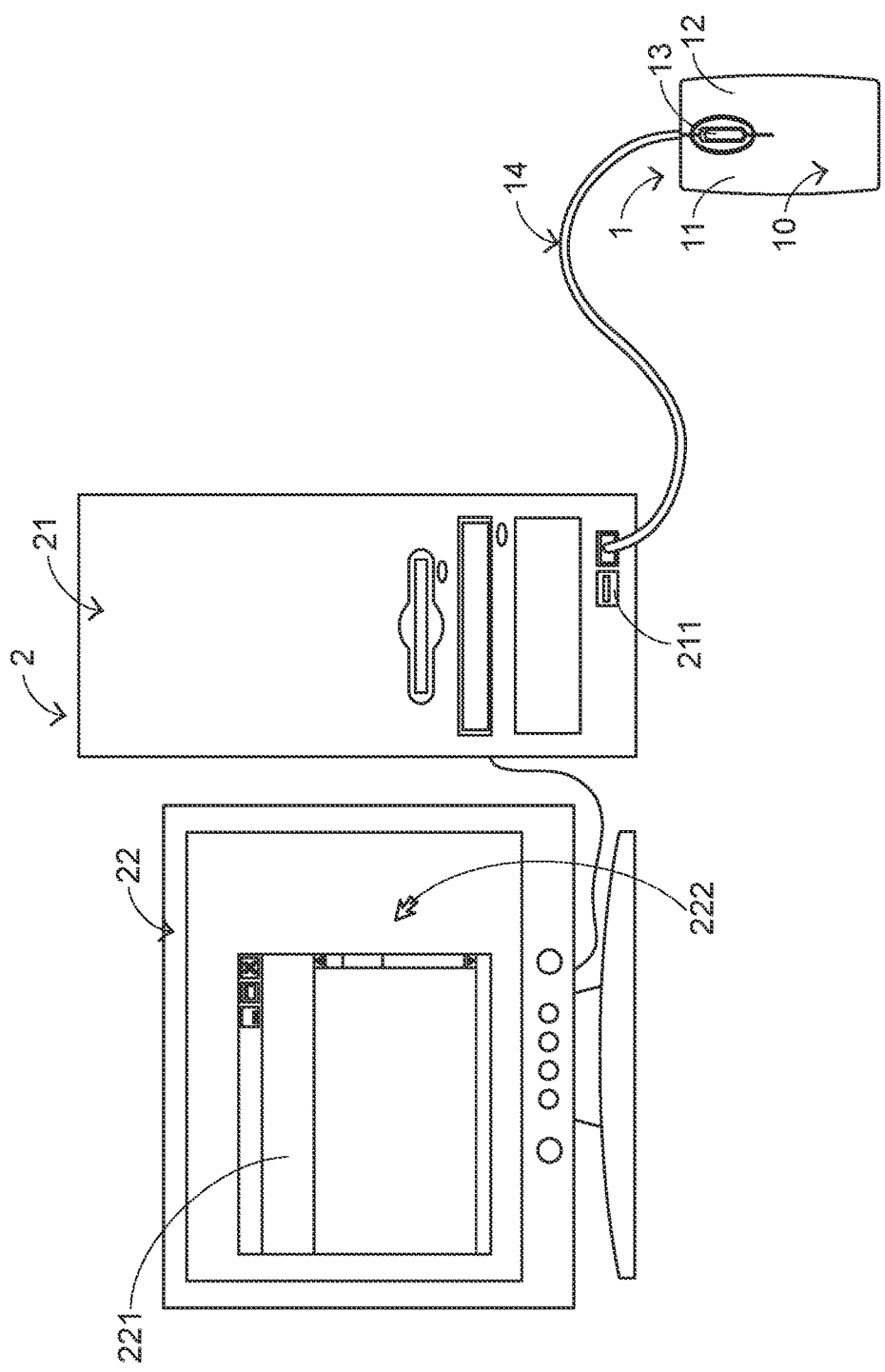
FIG. 1 is a schematic diagram illustrating the connection between a conventional mouse device and a computer system.
Figure 2:
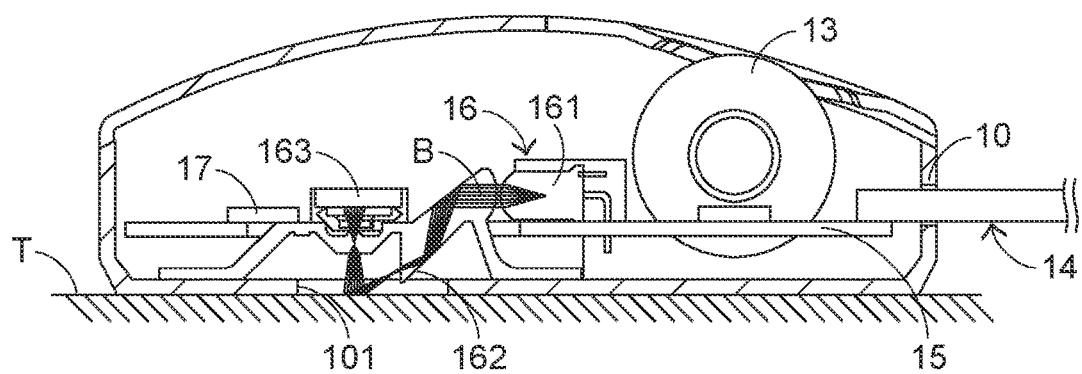
FIG. 2 is a schematic cross-sectional view illustrating the structure of the conventional mouse device.
Figure 3:
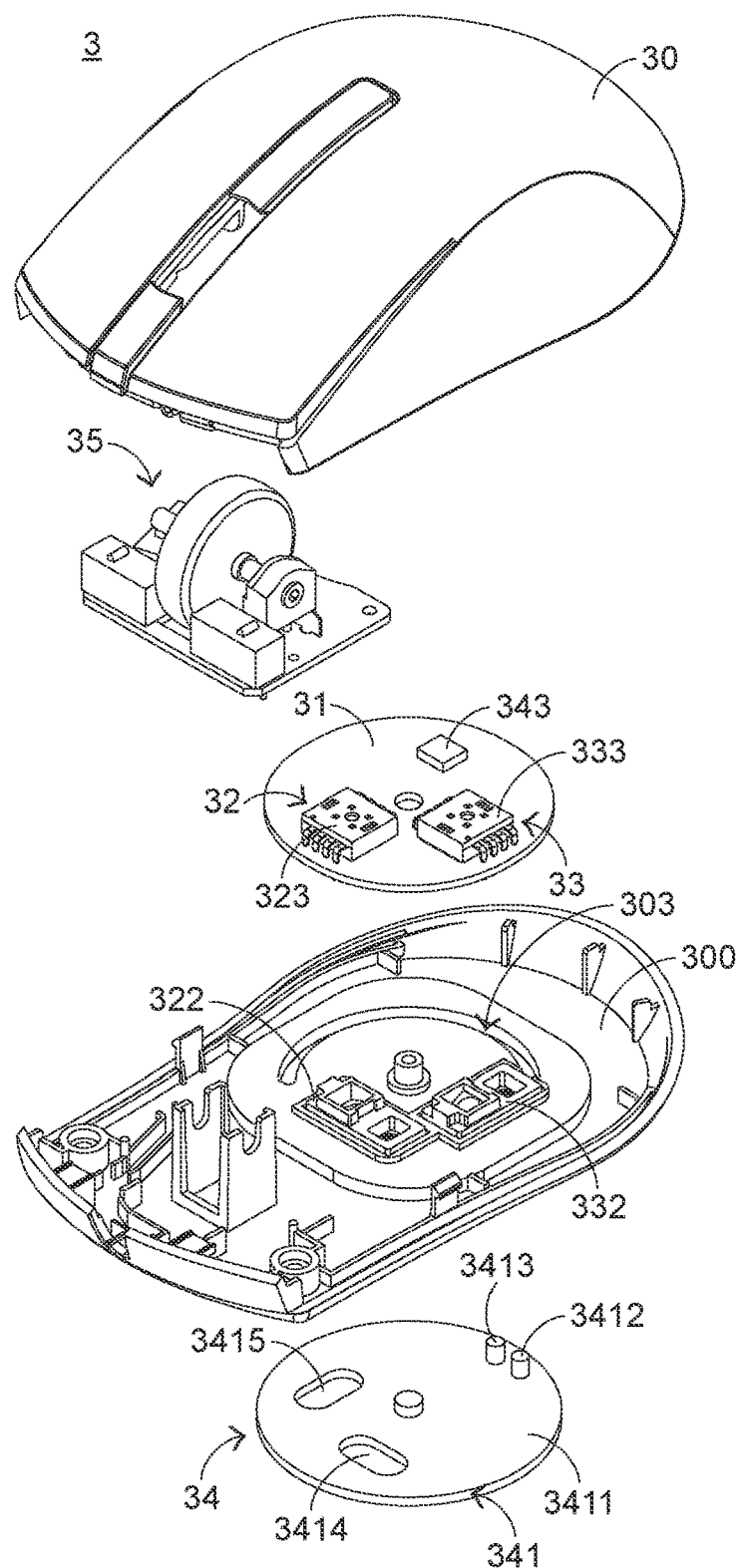
FIG. 3 is a schematic exploded view illustrating a mouse device according to a first embodiment of the present invention.
Figure 4:
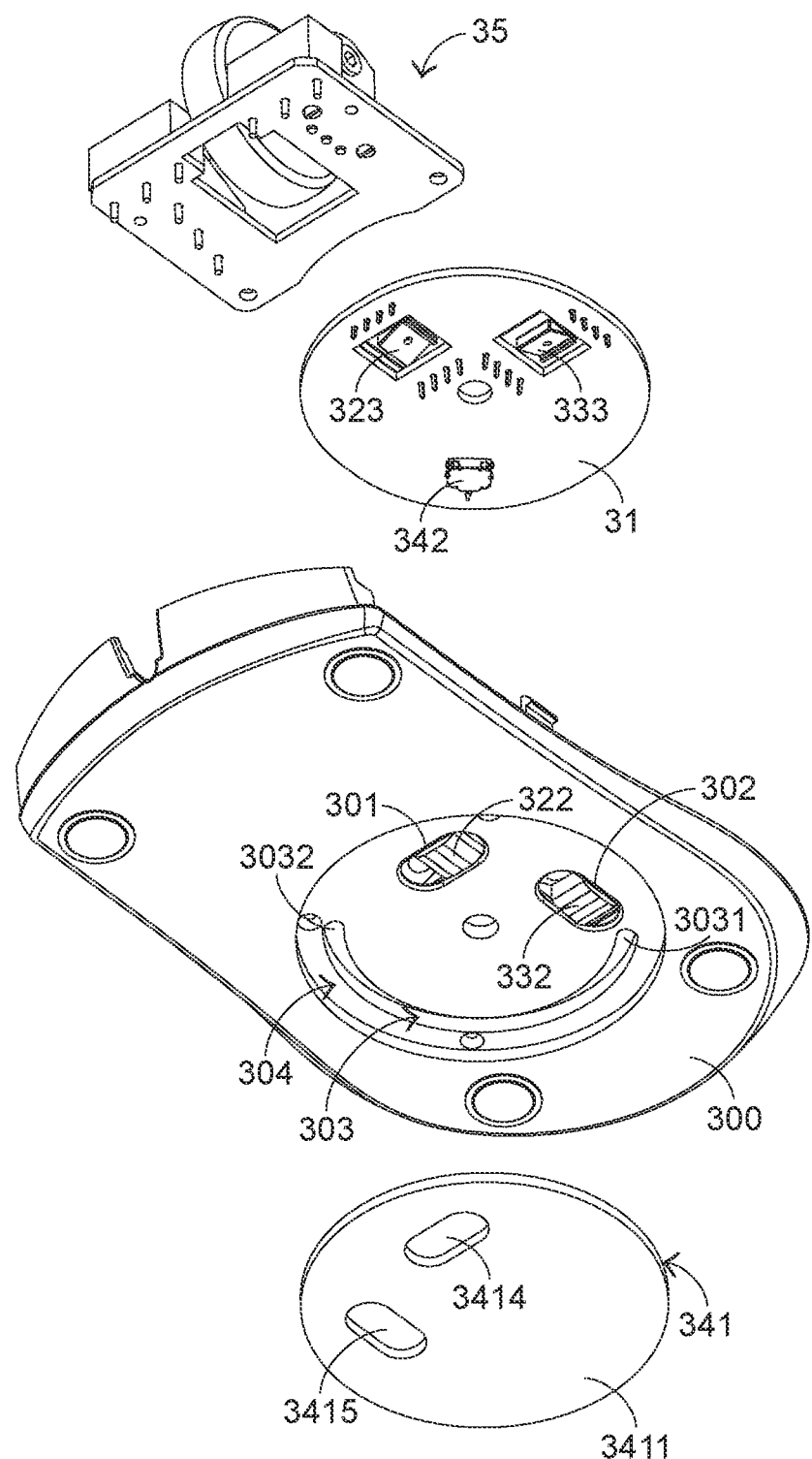
FIG. 4 is a schematic exploded view illustrating a portion of the mouse device according to the first embodiment of the present invention and taken along another viewpoint.
Figure 5:
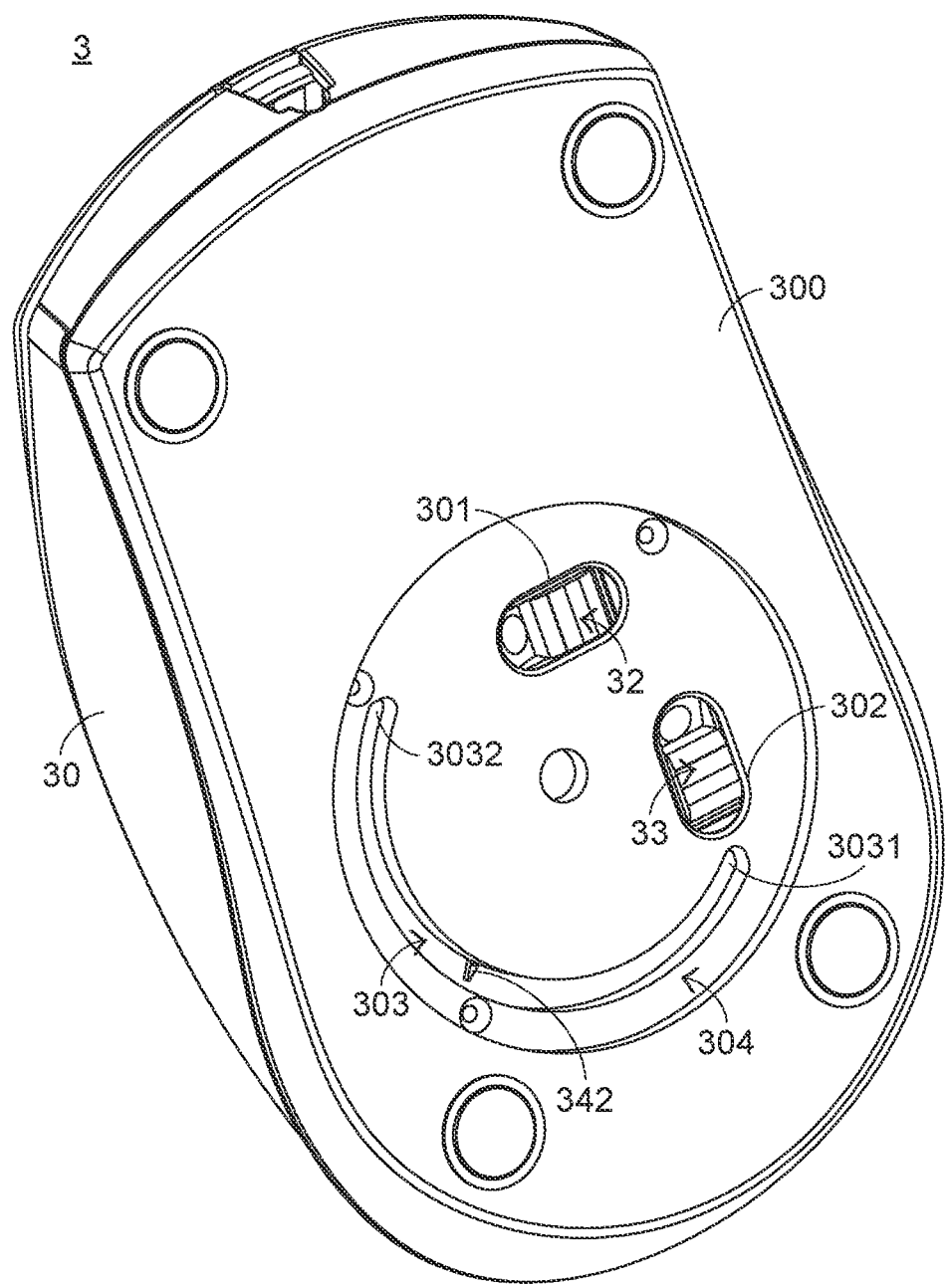
FIG. 5 is a schematic perspective view illustrating the mouse device according to the first embodiment of the present invention and taken along a further viewpoint.

Hereinafter, the structure of the mouse device of the present invention will be illustrated with reference to FIGS. 3, 4 and 5. FIG. 3 is a schematic exploded view illustrating a mouse device according to a first embodiment of the present invention. FIG. 4 is a schematic exploded view illustrating a portion of the mouse device according to the first embodiment of the present invention and taken along another viewpoint. FIG. 5 is a schematic perspective view illustrating the mouse device according to the first embodiment of the present invention and taken along a further viewpoint. The mouse device 3 is in communication with a computer system (not shown). Moreover, the mouse device 3 can control the movement of a cursor (not shown) of the computer system. In this embodiment, the mouse device 3 comprises a mouse casing 30, a circuit board 31, a first sensing module 32, a second sensing module 33, a switching module 34 and an operation module 35. The first sensing module 32 is disposed on the circuit board 31. Moreover, the first sensing module 32 may be partially exposed outside a bottom part 300 of the mouse casing 30. Similarly, the second sensing module 33 is disposed on the circuit board 31. Moreover, the second sensing module 33 may be partially exposed outside the bottom part 300 of the mouse casing 30. The switching module 34 is partially exposed outside the bottom part 300 of the mouse casing 30. Moreover, at least one of the first sensing module 32 and the second sensing module 33 is exposed outside the bottom part 300 of the mouse casing 30 through the switching module 34. Consequently, the moving resolution of the mouse device 3 can be adjusted. The operation module 35 comprises a left button, a right button and a scroll wheel. The structures of these components are similar to those of the conventional mouse device, and are not redundantly described herein.

Please refer to FIGS. 3 and 4 again. The circuit board 31 is disposed within the mouse casing 30. The mouse casing 30 comprises a first casing opening 301, a second casing opening 302, a track 303 and a receiving recess 304. The receiving recess 304 is formed in the bottom part 300 of the mouse casing 30. All of the first casing opening 301, the second casing opening 302 and the track 303 are formed in the bottom part 300 of the mouse casing 30 and disposed within the receiving recess 304. The first casing opening 301 is aligned with the first sensing module 32. The second casing opening 302 is aligned with the second sensing module 33. Moreover, the second casing opening 302 is located beside the first casing opening 301. Please refer to FIG. 5. The first sensing module 32 may be partially exposed outside the bottom part 300 of the mouse casing 30 through the first casing opening 301. The second sensing module 33 may be partially exposed outside the bottom part 300 of the mouse casing 30 through the second casing opening 302. In an embodiment, the circuit board 31 is a printed circuit board (PCB).

The switching module 34 comprises a switching plate 341, a detecting element 342 and a controlling unit 343. The switching plate 341 is disposed on the bottom part 300 of the mouse casing 30. When the switching plate 341 is received within the receiving recess 304, a part of the switching plate 341 is inserted into the track 303. When the switching plate 341 is rotated by the user, the switching plate 341 can be rotated relative to the mouse casing 30. The detecting element 342 is disposed on the circuit board 31 and located beside the track 303. Moreover, the detecting element 342 is used for detecting a rotating status of the switching plate 341 and generating a corresponding detecting signal. The controlling unit 343 is disposed on the circuit board 31 and electrically connected with the detecting element 342, the first sensing module 32 and the second sensing module 33. According to the detecting signal, the controlling unit 343 controls the operations of the first sensing module 32 and the second sensing module 33. Moreover, a first status value, a second status value and a third status value are previously stored in the controlling unit 343. When the detecting signal corresponding to the first status value is received by the controlling unit 343, the operations of the first sensing module 32 and the second sensing module 33 are controlled by the controlling unit 343 according to the first status value.

The switching plate 341 comprises a plate body 3411, a first protrusion post 3412 and a second protrusion post 3413. The plate body 3411 is disposed on the bottom part 300 of the mouse casing 30. Moreover, the plate body 3411 is received within the receiving recess 304 and rotatable relative to the mouse casing 30. The first protrusion post 3412 and the second protrusion post 3413 are disposed on the plate body 3411 and inserted into the track 303. As the plate body 3411 is rotated relative to the mouse casing 30, the detecting element 342 is selectively triggered by the first protrusion post 3412 and the second protrusion post 3413. Moreover, there is a gap between the first protrusion post 3412 and the second protrusion post 3413. The plate body 3411 comprises a first hole 3414 and a second hole 3415. As the plate body 3411 is rotated and the first hole 3414 or the second hole 3415 is aligned with the first sensing module 32, the first sensing module 32 is exposed outside the bottom part 300 of the mouse casing 30. As the plate body 3411 is rotated and the first hole 3414 or the second hole 3415 is aligned with the second sensing module 33, the second sensing module 33 is exposed outside the bottom part 300 of the mouse casing 30. In this embodiment, the shape of the plate body 3411 is complementary to the shape of the receiving recess 304.

Figure 6:
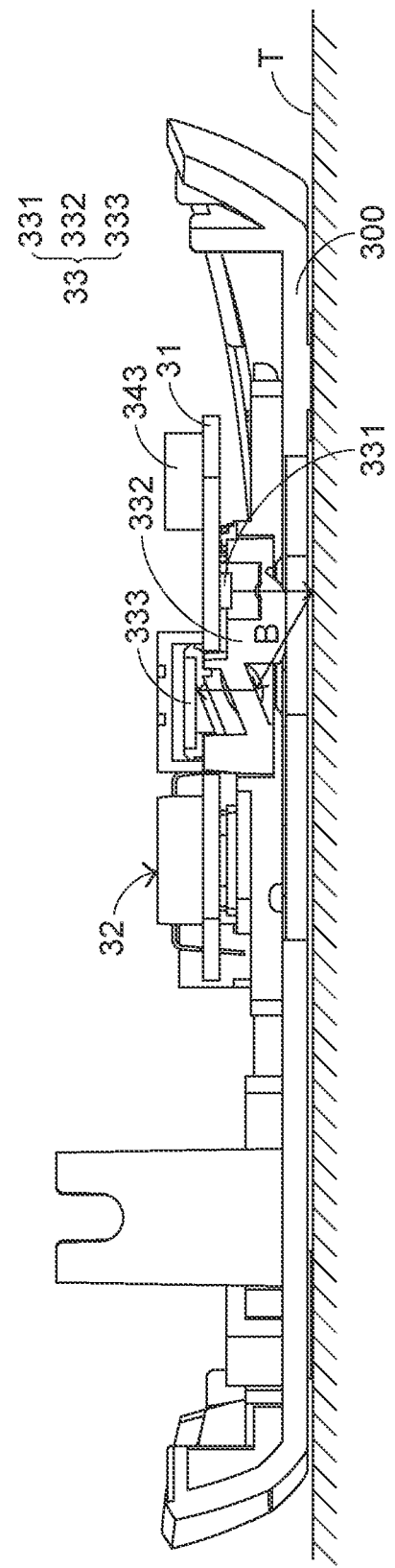
FIG. 6 is a schematic cross-sectional view illustrating a portion of the mouse device according to the first embodiment of the present invention.

The structures of the first sensing module 32 and the second sensing module 33 will be described with reference to FIGS. 3, 4 and 6. FIG. 6 is a schematic cross-sectional view illustrating a portion of the mouse device according to the first embodiment of the present invention. The first sensing module 32 comprises a first light-emitting element (not shown), a first optical lens 322 and a first optical sensor 323. The second sensing module 33 comprises a second light-emitting element 331, a second optical lens 332 and a second optical sensor 333. In FIG. 6, the detailed structure of the second sensing module 33 is shown. That is, the second sensing module 33 will be taken as an example for illustration. The second light-emitting element 331 is disposed on the circuit board 31 and electrically connected with the controlling unit 343. Moreover, the second light-emitting element 331 emits a light beam B. The second optical lens 332 is disposed on the bottom part 300 of the mouse casing 30. The light beam B can pass through the second optical lens 332. The second optical sensor 333 is disposed on the circuit board 31 and electrically connected with the controlling unit 343. After the light beam B passing through the second optical lens 332 is received by the second optical sensor 333, a working surface image is generated. In this embodiment, the first light-emitting element of the first sensing module 32 is an optical light source, and the second light-emitting element 331 of the second sensing module 33 is a laser light source. In other words, the first sensing module 32 is an optical sensing module, and the second sensing module 33 is a laser sensing module. The other structures of the second sensing module 33 are similar to those of the first sensing module 32, and are not redundantly described herein. The principles of generating the displacement signal by the first sensing module 32 and the second sensing module 33 are similar to those of the conventional technologies, and are not redundantly described herein.

Figure 7:
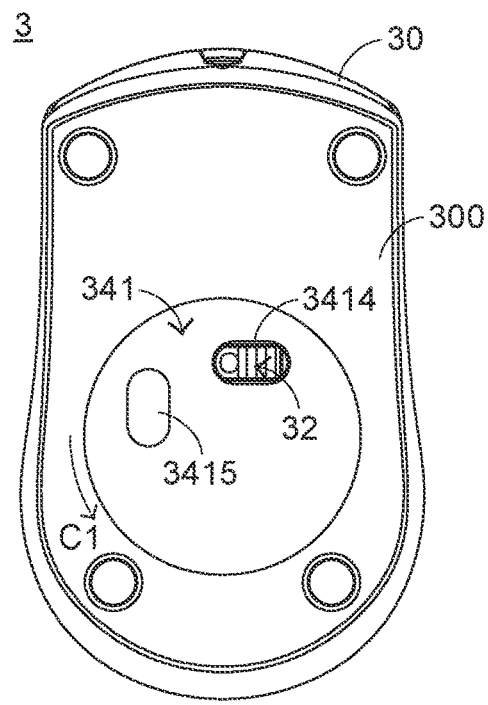
FIG. 7 is a schematic bottom view illustrating the mouse device of the first embodiment in a first status.

Please refer to FIGS. 3, 4 and 7. FIG. 7 is a schematic bottom view illustrating the mouse device of the first embodiment in a first status. When the mouse device 3 is used to perform the document processing task, the user may rotate the switching plate 341 in a first rotating direction C1. Consequently, the plate body 3411 within the receiving recess 304 is rotated relative to the mouse casing 30 in the first rotating direction C1. When the first protrusion post 3412 is moved to a first end 3031 of the track 303 and the second protrusion post 3413 is moved to a nearby position of the first end 3031 of the track 303, the first hole 3414 is aligned with the first sensing module 32. Consequently, the first sensing module 32 is exposed to the outside. While the first protrusion post 3412 and the second protrusion post 3413 are moved, the first protrusion post 3412 and the second protrusion post 3413 are moved across the detecting element 342. Consequently, the detecting element 342 is triggered to generate the detecting signal corresponding to the first status value (e.g., 1). Moreover, the detecting signal is transmitted from the detecting element 342 to the controlling unit 343. According to the first status value, the controlling unit 343 enables the first sensing module 32 and controls the second sensing module 33 to enter a hibernation mode. Under this circumstance, the mouse device 3 is in an operation mode corresponding to a low moving resolution.

In this embodiment, the detecting element 342 is a counter. When the plate body 3411 is rotated relative to the mouse casing 30 in the first rotating direction C1, the detecting element 342 is triggered once. Consequently, the counting value of the detecting element 342 is decreased by 1.

Figure 8:
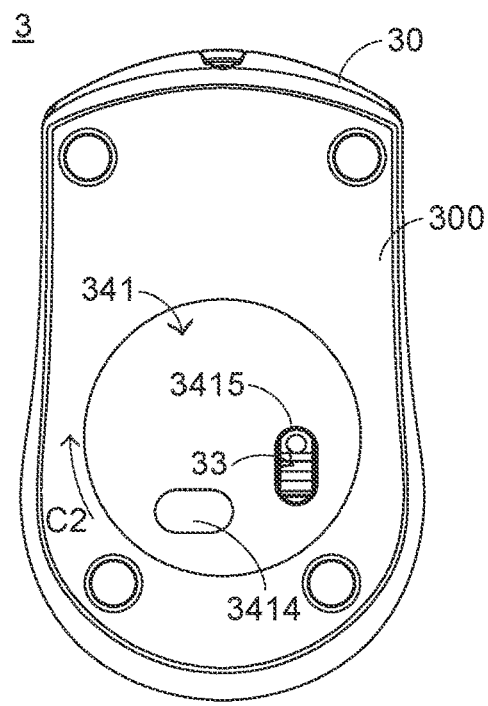
FIG. 8 is a schematic bottom view illustrating the mouse device of the first embodiment in a second status.

Please refer to FIGS. 3, 4 and 8. FIG. 8 is a schematic bottom view illustrating the mouse device of the first embodiment in a second status. When the mouse device 3 is used to operate the computer game and it is necessary to increase the moving resolution of the mouse device 3, the user may rotate the switching plate 341 in a second rotating direction C2. Consequently, the plate body 3411 within the receiving recess 304 is rotated relative to the mouse casing 30 in the second rotating direction C2. In addition, the second protrusion post 3413 is moved from the nearby position of the first end 3031 of the track 303 to a second end 3032 of the track 303, and the first protrusion post 3412 is moved from the first end 3031 of the track 303 to the nearby position of the second end 3032 of the track 303. Under this circumstance, the second hole 3415 is aligned with the second sensing module 33. Consequently, the second sensing module 33 is exposed to the outside. While the first protrusion post 3412 and the second protrusion post 3413 are moved, the first protrusion post 3412 and the second protrusion post 3413 are moved across the detecting element 342 to trigger the detecting element 342. Since the detecting element 342 is triggered by the second protrusion post 3413 and the first protrusion post 3412 sequentially, the counting value of the detecting element 342 is changed from 1 to 3. Meanwhile, the detecting element 342 is triggered to generate the detecting signal corresponding to the second status value (i.e., 3). Moreover, the detecting signal is transmitted from the detecting element 342 to the controlling unit 343. According to the second status value, the controlling unit 343 enables the second sensing module 33 and controls the first sensing module 32 to enter the hibernation mode. Under this circumstance, the mouse device 3 is in an operation mode corresponding to a high moving resolution.

Figure 9:
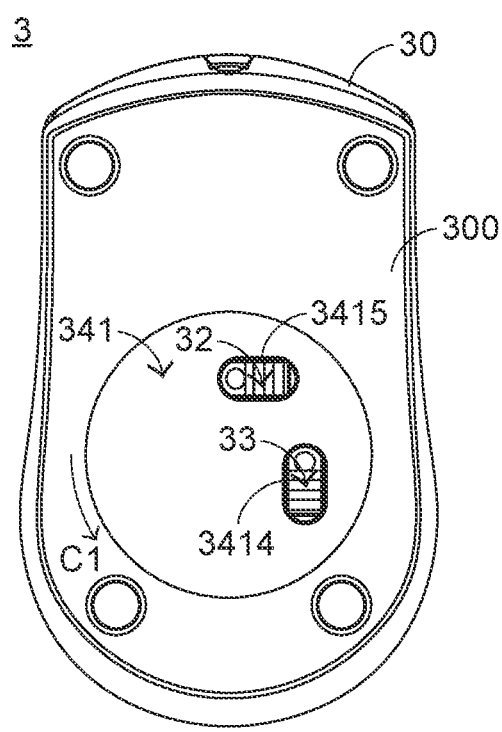
FIG. 9 is a schematic bottom view illustrating the mouse device of the first embodiment in a third status.

Please refer to FIGS. 3, 4 and 9. FIG. 9 is a schematic bottom view illustrating the mouse device of the first embodiment in a third status. When the very high moving resolution of the mouse device 3 is required, the user may rotate the switching plate 341 in the first rotating direction C1. Consequently, the plate body 3411 within the receiving recess 304 is rotated relative to the mouse casing 30 in the first rotating direction C1. In addition, the first protrusion post 3412 is moved from the nearby position of the second end 3032 of the track 303 to the middle segment of the track 303, and the second protrusion post 3413 is moved from the second end 3032 of the track 303 to the nearby position of the detecting element 342. Meanwhile, the first hole 3414 is aligned with the second sensing module 33, and the second hole 3415 is aligned with the first sensing module 32. Consequently, both of the first sensing module 32 and the second sensing module 33 are exposed to the outside. While the first protrusion post 3412 and the second protrusion post 3413 are moved, the first protrusion post 3412 is moved across the detecting element 342 to trigger the detecting element 342. However, since the second protrusion post 3413 is not moved across the detecting element 342, the detecting element 342 is not triggered. Since the detecting element 342 is arranged between the first protrusion post 3412 and the second protrusion post 3413, the detecting element 342 is triggered once only. The counting value of the detecting element 342 is changed from 3 to 2. Meanwhile, the detecting element 342 is triggered to generate the detecting signal corresponding to the third status value (i.e., 2). Moreover, the detecting signal is transmitted from the detecting element 342 to the controlling unit 343. According to the third status value, the controlling unit 343 enables the first sensing module 32 and the second sensing module 33.

Since both of the first sensing module 32 and the second sensing module 33 are enabled to generate the displacement signal, the moving resolution of the mouse device 3 is further increased. Moreover, the uses of the first sensing module 32 and the second sensing module 33 to acquire the working surface image of the working surface T are more beneficial. For example, if the working surface is not suitable for the first sensing module 32, the second sensing module 33 is responsible for generating the displacement signal. Whereas, if the working surface is not suitable for the second sensing module 33, the first sensing module 32 is responsible for generating the displacement signal. That is, if one of the two sensing modules is adversely affected by the working surface, the other sensing module can be normally operated. Consequently, the operation of the mouse device 3 is not influenced by the mouse device. In other words, the mouse device 3 is suitably operated on various working surfaces.

Figure 10:
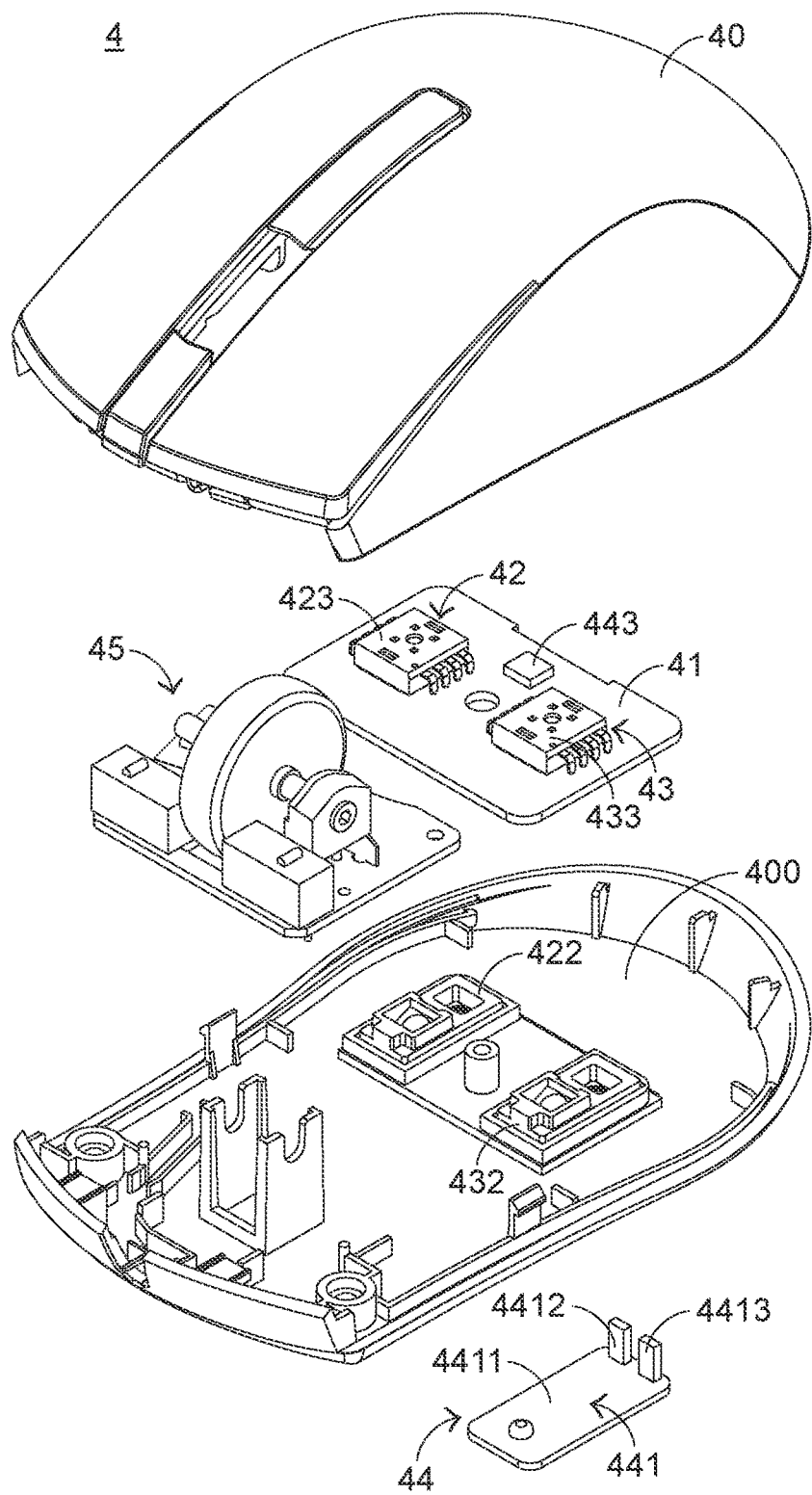
FIG. 10 is a schematic exploded view illustrating a mouse device according to a second embodiment of the present invention.
Figure 11:
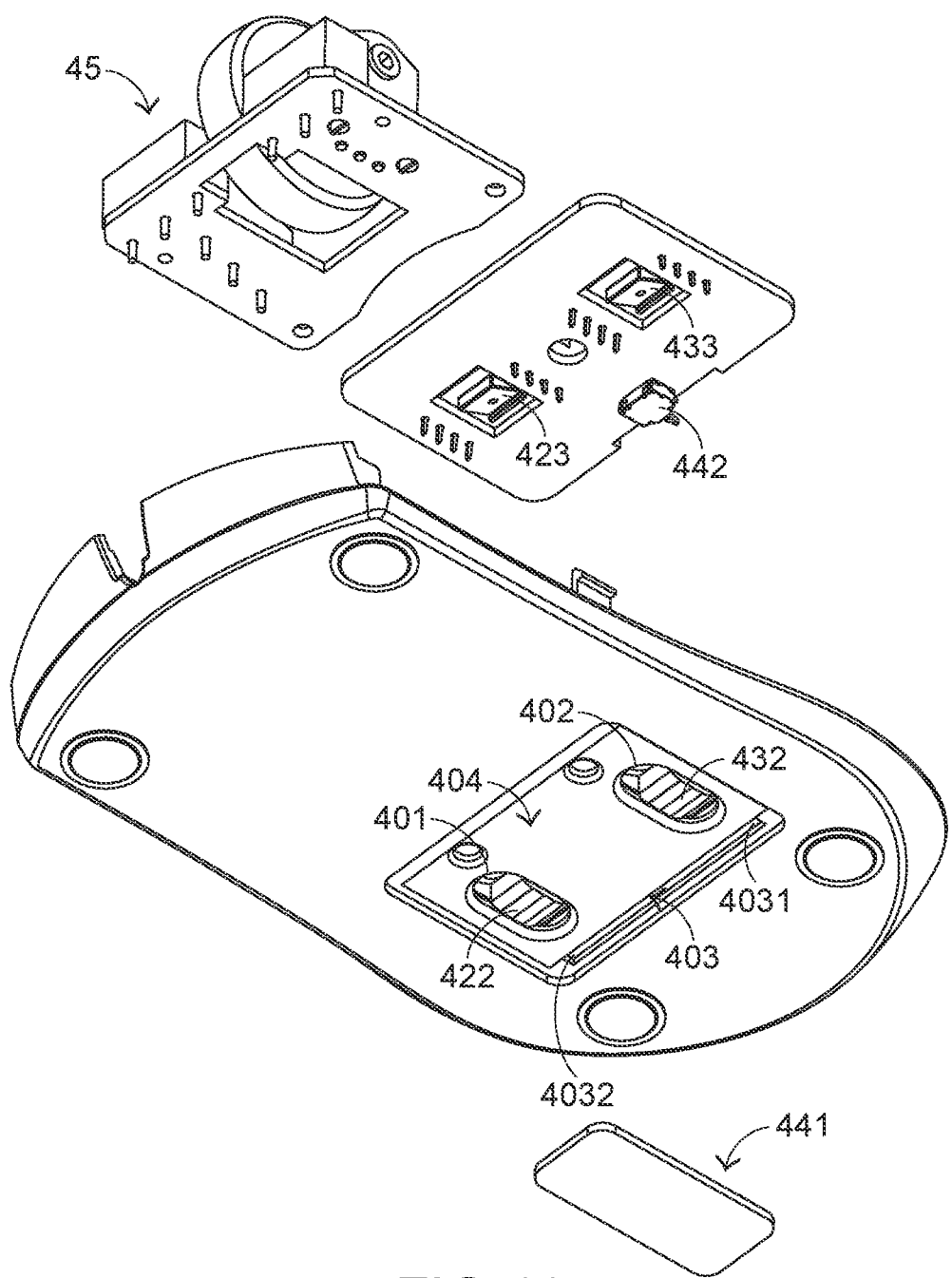
FIG. 11 is a schematic exploded view illustrating a portion of the mouse device according to the second embodiment of the present invention and taken along another viewpoint.
Figure 12:
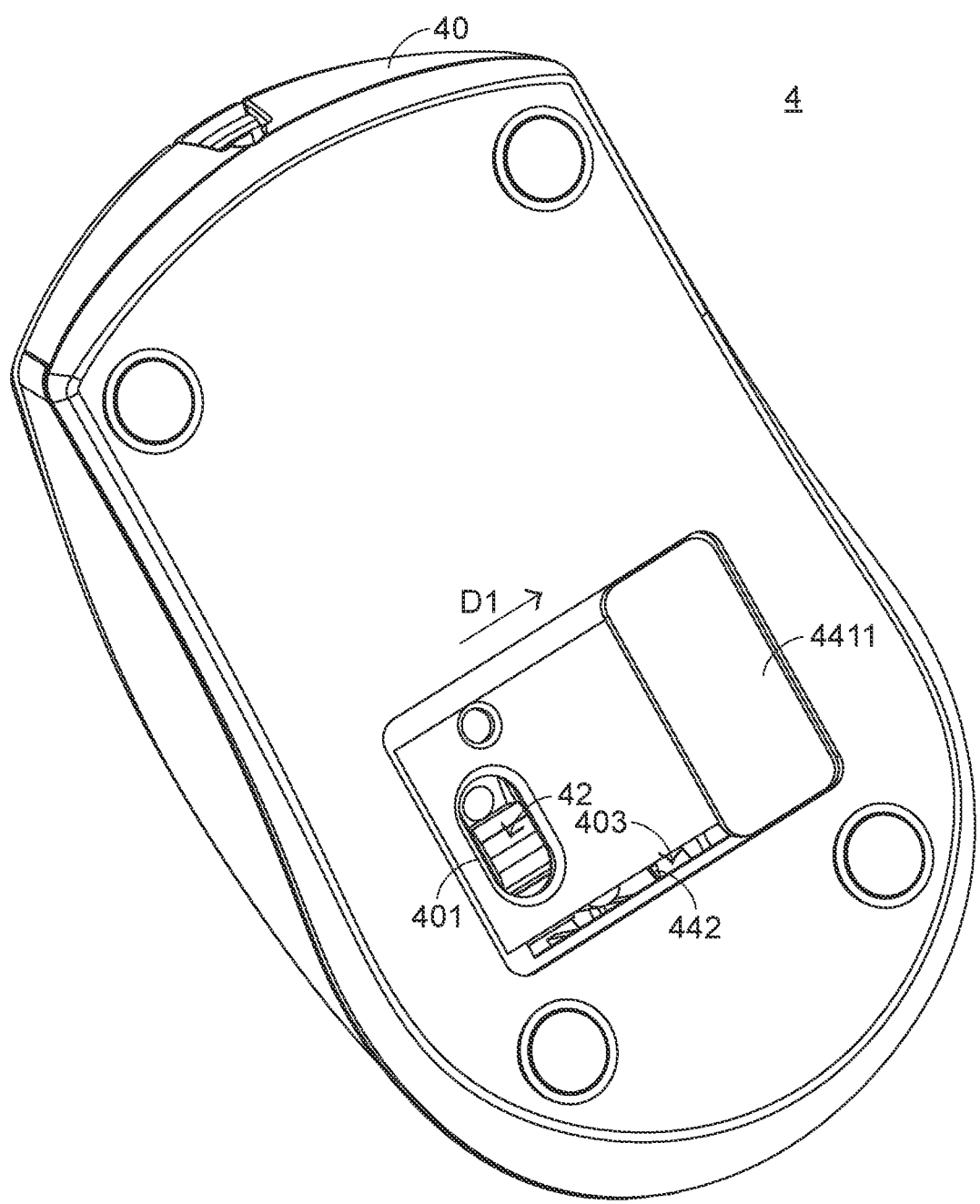
FIG. 12 is a schematic perspective view illustrating the mouse device according to the second embodiment of the present invention and taken along a further viewpoint.

The present invention further provides a second embodiment, which is distinguished from the first embodiment. Please refer to FIGS. 10, 11 and 12. FIG. 10 is a schematic exploded view illustrating a mouse device according to a second embodiment of the present invention. FIG. 11 is a schematic exploded view illustrating a portion of the mouse device according to the second embodiment of the present invention and taken along another viewpoint. FIG. 12 is a schematic perspective view illustrating the mouse device according to the second embodiment of the present invention and taken along a further viewpoint. In this embodiment, the mouse device 4 comprises a mouse casing 40, a circuit board 41, a first sensing module 42, a second sensing module 43, a switching module 44 and an operation module 45. The mouse casing 40 comprises a first casing opening 401, a second casing opening 402, a track 403 and a receiving recess 404. The first sensing module 42 comprises a first light-emitting element (not shown), a first optical lens 422 and a first optical sensor 423. The second sensing module 43 comprises a second light-emitting element (not shown), a second optical lens 432 and a second optical sensor 433. The switching module 44 comprises a switching plate 441, a detecting element 442 and a controlling unit 443. Except for the following two items, the structures and functions of the mouse device 4 of this embodiment are substantially identical to those of the mouse device 3 of the first embodiment, and are not redundantly described herein. Firstly, the shapes of the track 403 and the receiving recess 404 are distinguished. Secondly, the structure of the switching module 44 is distinguished.

As shown in FIGS. 11 and 12, the receiving recess 404 has a rectangular shape, which is different from the circular shape of the receiving recess 304 of the first embodiment. The track 403 has a linear shape, which is different from the arc shape of the track 303 of the first embodiment. The switching plate 441 comprises a plate body 4411, a first protrusion post 4412 and a second protrusion post 4413. The plate body 4411 has a shape corresponding to the receiving recess 404. That is, the plate body 4411 is also rectangular. In comparison with the above embodiment, the plate body 4411 is not equipped with any hole. Moreover, the plate body 4411 is received within the receiving recess 404 and movable relative to the mouse casing 40. In this embodiment, the plate body 4411 is not rotated relative to the mouse casing 40.

Please refer to FIGS. 10, 11 and 12 again. When the mouse device 4 is used to perform a document processing task, the user may rotate the switching plate 441 in a first direction D1. Consequently, the plate body 4411 within the receiving recess 404 is moved relative to the mouse casing 40 in the first direction D1. When the plate body 4411 is moved to a first position of the receiving recess 404, the first protrusion post 4412 is moved to a first end 4031 of the track 403 and the second protrusion post 4413 is moved to a nearby position of the first end 4031 of the track 403. Consequently, the first sensing module 42 is exposed to the outside. While the first protrusion post 4412 and the second protrusion post 4413 are moved, the first protrusion post 4412 and the second protrusion post 4413 are moved across the detecting element 442. Consequently, the detecting element 442 is triggered to generate the detecting signal corresponding to the first status value (e.g., 1). Moreover, the detecting signal is transmitted from the detecting element 442 to the controlling unit 443. According to the first status value, the controlling unit 443 enables the first sensing module 42 and controls the second sensing module 43 to enter a hibernation mode. Under this circumstance, the mouse device 4 is in an operation mode corresponding to a low moving resolution.

Figure 13:
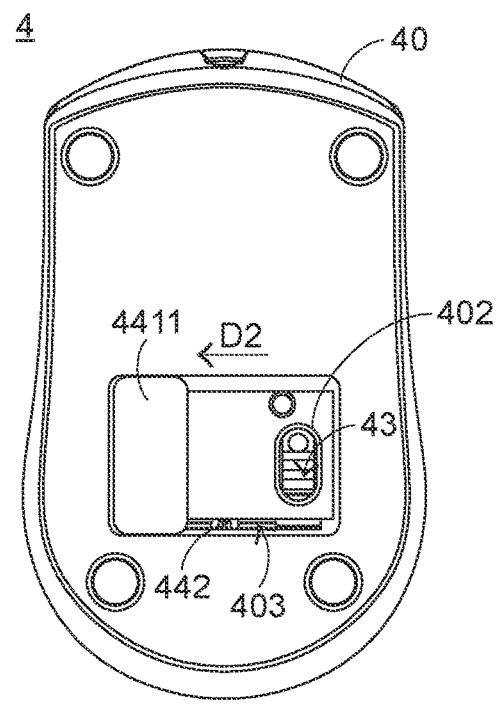
FIG. 13 is a schematic bottom view illustrating the mouse device of the second embodiment in a second status.

Please refer to FIGS. 10, 11 and 13. FIG. 13 is a schematic bottom view illustrating the mouse device of the second embodiment in a second status. When the mouse device 4 is used to operate the computer game and it is necessary to increase the moving resolution of the mouse device 4, the user may move the switching plate 441 in a second direction D2. Consequently, the plate body 4411 within the receiving recess 404 is moved relative to the mouse casing 40 in the second direction D2. In addition, the second protrusion post 4413 is moved from the nearby position of the first end 4031 of the track 403 to a second end 4032 of the track 403, and the first protrusion post 4412 is moved from the first end 4031 of the track 403 to the nearby position of the second end 4032 of the track 403. Consequently, the second sensing module 43 is exposed to the outside. While the first protrusion post 4412 and the second protrusion post 4413 are moved, the first protrusion post 4412 and the second protrusion post 4413 are moved across the detecting element 442 to trigger the detecting element 442. Since the detecting element 442 is triggered by the second protrusion post 4413 and the first protrusion post 4412 sequentially, the counting value of the detecting element 442 is changed from 1 to 3. Meanwhile, the detecting element 442 is triggered to generate the detecting signal corresponding to the second status value (i.e., 3). Moreover, the detecting signal is transmitted from the detecting element 442 to the controlling unit 443. According to the second status value, the controlling unit 443 enables the second sensing module 43 and controls the first sensing module 42 to enter the hibernation mode. Under this circumstance, the mouse device 4 is in an operation mode corresponding to a high moving resolution.

Figure 14:
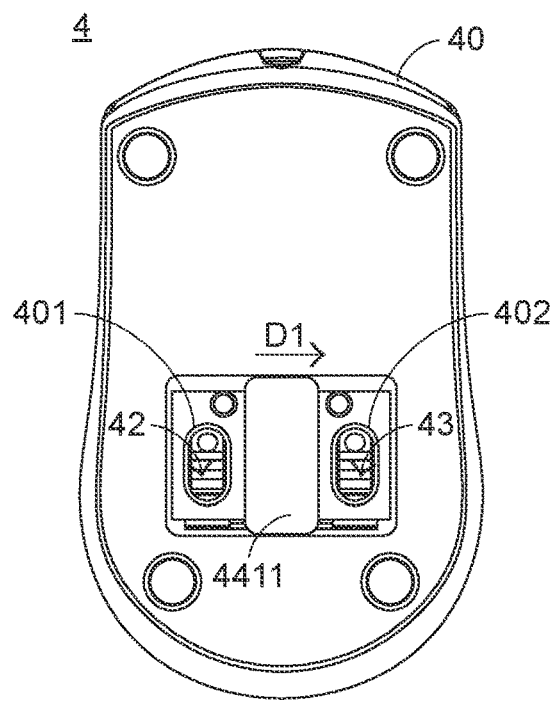
FIG. 14 is a schematic bottom view illustrating the mouse device of the second embodiment in a third status.

Please refer to FIGS. 10, 11 and 14. FIG. 14 is a schematic bottom view illustrating the mouse device of the second embodiment in a third status. When the very high moving resolution of the mouse device 4 is required, the user may move the switching plate 441 in the first direction D1. Consequently, the plate body 4411 within the receiving recess 404 is moved relative to the mouse casing 40 in the first direction D1. In addition, the first protrusion post 4412 is moved from the nearby position of the second end 4032 of the track 403 to the middle segment of the track 403, and the second protrusion post 4413 is moved from the second end 4032 of the track 403 to the nearby position of the detecting element 442. Consequently, both of the first sensing module 42 and the second sensing module 43 are exposed to the outside and not sheltered by the plate body 4411. While the first protrusion post 4412 and the second protrusion post 4413 are moved, the first protrusion post 4412 is moved across the detecting element 442 to trigger the detecting element 442. However, since the second protrusion post 4413 is not moved across the detecting element 442, the detecting element 442 is not triggered. Since the detecting element 442 is arranged between the first protrusion post 4412 and the second protrusion post 4413, the detecting element 442 is triggered once only. The counting value of the detecting element 442 is changed from 3 to 2. Meanwhile, the detecting element 442 is triggered to generate the detecting signal corresponding to the third status value (i.e., 2). Moreover, the detecting signal is transmitted from the detecting element 442 to the controlling unit 443. According to the third status value, the controlling unit 443 enables the first sensing module 42 and the second sensing module 43. Since both of the first sensing module 42 and the second sensing module 43 are enabled to generate the displacement signal, the moving resolution of the mouse device 4 is further increased.

From the above descriptions, the mouse device of the present invention comprises plural sensing modules. The suitable sensing module is used according to the corresponding requirement. Alternatively, the plural sensing modules are simultaneously used. As the switching plate of the switching module is rotated (or moved) to shelter the unavailable sensing module, the required sensing module is exposed. The mechanical structure of the switching module cooperates with the simple detecting element and the controlling unit to achieve the function of switching the sensing module. Consequently, the mouse device of the present invention is simple and cost-effective. The uses of plural sensing modules are more beneficial. If one of the plural sensing modules is not suitably applied to the working surface, the other sensing module or sensing modules can be normally operated. Consequently, the operation of the mouse device is not influenced by the mouse device. In other words, the mouse device of the present invention is suitably operated on various working surfaces.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse device in communication with a computer system for controlling movement of a cursor of the computer system, the mouse device comprising:
   a mouse casing comprising a receiving recess, wherein the receiving recess is formed in a bottom part of the mouse casing and exposed outside the mouse casing;
   a circuit board disposed within the mouse casing;
   a first sensing module disposed on the circuit board, wherein a part of the first sensing module is selectively exposed outside the bottom part of the mouse casing;
   a second sensing module disposed on the circuit board, wherein a part of the second sensing module is selectively exposed outside the bottom part of the mouse casing; and
   a switching module partially received within the receiving recess and partially exposed outside the bottom part of the mouse casing, wherein at least one of the first sensing module and the second sensing module is exposed outside the bottom part of the mouse casing through the switching module, so that a moving resolution of the mouse device is adjustable, wherein the mouse casing comprises:
- a first casing opening aligned with the first sensing module and disposed within the receiving recess;
- a second casing opening aligned with the second sensing module and disposed within the receiving recess; and
- a track disposed within the receiving recess, wherein the first sensing module is partially exposed outside the bottom part of the mouse casing through the first casing opening, and the second sensing module is partially exposed outside the bottom part of the mouse casing through the second casing opening, wherein the switching module comprises:
- a switching plate received within the receiving recess, and partially inserted into the groove, wherein the switching plate is movable or rotatable relative to the mouse casing;
- a detecting element disposed on the circuit board and located beside the track, wherein when a rotating status and a moving status of the switching plate is detected by the detecting element, a detecting signal is generated by the detecting element; and
- a controlling unit disposed on the circuit board and electrically connected with the detecting element, the first sensing module and the second sensing module, wherein the controlling unit controls operations of the first sensing module and the second sensing module according to the detecting signal, wherein the switching plate comprises:
- a plate body received within the receiving recess and rotatable relative to the mouse casing, wherein the plate body comprises a first hole and a second hole; and
- a protrusion post disposed on the plate body and inserted into the track, wherein as the switching plate is rotated relative to the mouse casing, the detecting element is triggered by the protrusion post, wherein as the plate body is rotated and the first hole or the second hole is aligned with the first sensing module, the first sensing module is exposed outside the bottom part of the mouse casing, wherein as the plate body is rotated and the first hole or the second hole is aligned with the second sensing module, the second sensing module is exposed outside the bottom part of the mouse casing.

2. The mouse device according to claim 1, wherein the mouse device is placed on a working surface, and the first sensing module comprises:
- a light-emitting element disposed on the circuit board, and emitting a light beam;
- an optical lens disposed on the bottom part of the mouse casing, wherein the light beam is permitted to pass through the optical lens, wherein after the light beam passes through the optical lens, the light beam is projected onto the working surface and reflected to the optical lens by the working surface; and
- an optical sensor disposed on the circuit board, wherein when the light beam passing through the optical lens is received by the optical sensor, a working surface image is generated.

3. The mouse device according to claim 1, wherein the first sensing module is an optical sensing module, and the second sensing module is a laser sensing module.

4. The mouse device according to claim 1, wherein a first status value, a second status value and a third status value are previously stored in the controlling unit, wherein when the controlling unit receives the detecting signal corresponding to the first status value, the controlling unit enables the first sensing module and controls the second sensing module to enter a hibernation mode, wherein when the controlling unit receives the detecting signal corresponding to the second status value, the controlling unit enables the second sensing module and controls the first sensing module to enter the hibernation mode, wherein when the controlling unit receives the detecting signal corresponding to the third status value, the controlling unit enables the first sensing module and the second sensing module.

5. A mouse device in communication with a computer system for controlling movement of a cursor of the computer system, the mouse device comprising:
- a mouse casing comprising a receiving recess, wherein the receiving recess is formed in a bottom part of the mouse casing and exposed outside the mouse casing;
- a circuit board disposed within the mouse casing;
- a first sensing module disposed on the circuit board, wherein a part of the first sensing module is selectively exposed outside the bottom part of the mouse casing;
- a second sensing module disposed on the circuit board, wherein a part of the second sensing module is selectively exposed outside the bottom part of the mouse casing; and
- a switching module partially received within the receiving recess and partially exposed outside the bottom part of the mouse casing, wherein at least one of the first sensing module and the second sensing module is exposed outside the bottom part of the mouse casing through the switching module, so that a moving resolution of the mouse device is adjustable, wherein the mouse casing comprises:
- a first casing opening aligned with the first sensing module and disposed within the receiving recess;
- a second casing opening aligned with the second sensing module and disposed within the receiving recess; and
- a track disposed within the receiving recess, wherein the first sensing module is partially exposed outside the bottom part of the mouse casing through the first casing opening, and the second sensing module is partially exposed outside the bottom part of the mouse casing through the second casing opening, wherein the switching module comprises:
- a switching plate received within the receiving recess, and partially inserted into the groove, wherein the switching plate is movable or rotatable relative to the mouse casing;
- a detecting element disposed on the circuit board and located beside the track, wherein when a rotating status and a moving status of the switching plate is detected by the detecting element, a detecting signal is generated by the detecting element; and
- a controlling unit disposed on the circuit board and electrically connected with the detecting element, the first sensing module and the second sensing module, wherein the controlling unit controls operations of the first sensing module and the second sensing module according to the detecting signal, wherein the switching plate comprises:
- a plate body disposed within the receiving recess, wherein the plate body is movable within the receiving recess and relative to the mouse casing; and a protrusion post disposed on the plate body and inserted into the track, wherein as the switching plate is moved relative to the mouse casing, the detecting element is triggered by the protrusion post, wherein when the plate body is moved to a first position of the receiving recess, the first sensing module is exposed outside the bottom part of the mouse casing, wherein when the plate body is moved to a second position of the receiving recess, the second sensing module is exposed outside the bottom part of the mouse casing, wherein when the plate body is moved to a third position of the receiving recess, both of the first sensing module and the second sensing module are exposed outside the bottom part of the mouse casing.

6. The mouse device according to claim 5, wherein a first status value, a second status value and a third status value are previously stored in the controlling unit, wherein when the controlling unit receives the detecting signal corresponding to the first status value, the controlling unit enables the first sensing module and controls the second sensing module to enter a hibernation mode, wherein when the controlling unit receives the detecting signal corresponding to the second status value, the controlling unit enables the second sensing module and controls the first sensing module to enter the hibernation mode, wherein when the controlling unit receives the detecting signal corresponding to the third status value, the controlling unit enables the first sensing module and the second sensing module.

7. The mouse device according to claim 5, wherein the mouse device is placed on a working surface, and the first sensing module comprises:
　　a light-emitting element disposed on the circuit board, and emitting a light beam;
　　an optical lens disposed on the bottom part of the mouse casing, wherein the light beam is permitted to pass through the optical lens, wherein after the light beam passes through the optical lens, the light beam is projected onto the working surface and reflected to the optical lens by the working surface; and
　　an optical sensor disposed on the circuit board, wherein when the light beam passing through the optical lens is received by the optical sensor, a working surface image is generated.

8. The mouse device according to claim 5, wherein the first sensing module is an optical sensing module, and the second sensing module is a laser sensing module.

\* \* \* \* \*